United States Patent
Duisit et al.

(10) Patent No.: US 6,810,688 B1
(45) Date of Patent: Nov. 2, 2004

(54) METHOD FOR TREATING GLASS SUBSTRATES AND GLASS SUBSTRATES FOR THE PRODUCING OF DISPLAY SCREENS

(75) Inventors: Géraldine Duisit, Paris (FR); Olivier Gaume, Levallois Perret (FR); René Gy, Bondy (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/111,320

(22) PCT Filed: Nov. 22, 2000

(86) PCT No.: PCT/FR00/03242

§ 371 (c)(1),
(2), (4) Date: Apr. 24, 2002

(87) PCT Pub. No.: WO01/38249

PCT Pub. Date: May 31, 2001

(30) Foreign Application Priority Data

Nov. 22, 1999 (FR) .............................................. 99 14676

(51) Int. Cl.$^7$ .......................... C03C 15/00; C03C 3/078
(52) U.S. Cl. ...................... 65/30.13; 65/30.1; 65/30.14; 501/72; 501/70
(58) Field of Search .............................. 501/69, 70, 72; 65/30.1, 117, 30.8

(56) References Cited

U.S. PATENT DOCUMENTS

| | | | | |
|---|---|---|---|---|
| 5,776,844 A | * | 7/1998 | Koch et al. | 501/70 |
| 5,780,371 A | * | 7/1998 | Rifqi et al. | 501/67 |
| 5,858,897 A | * | 1/1999 | Maeda et al. | 501/70 |
| 5,888,917 A | * | 3/1999 | Kawaguchi et al. | 501/70 |
| 5,916,656 A | | 6/1999 | Murano et al. | |
| 6,162,750 A | * | 12/2000 | Miwa et al. | 501/69 |
| 6,297,182 B1 | * | 10/2001 | Maeda et al. | 501/66 |

FOREIGN PATENT DOCUMENTS

| | | | |
|---|---|---|---|
| FR | 2595091 A2 | * | 9/1987 |
| FR | 2 595 091 | | 9/1987 |
| JP | 10 067544 | | 3/1998 |
| WO | WO 98/01399 | * | 1/1998 |

\* cited by examiner

*Primary Examiner*—Karl Group
*Assistant Examiner*—Elizabeth A. Bolden
(74) *Attorney, Agent, or Firm*—Oblon, Spivak, McClelland, Maier & Neustadt, P.C.

(57) ABSTRACT

The subject of the invention is a process for treating a glass sheet which consists of a glass composition having a strain point above 540° C. and is intended for producing a display screen, the said process including at least one ion-exchange treatment on at least part of the surface of the glass sheet and a precontraction treatment.

12 Claims, No Drawings

METHOD FOR TREATING GLASS SUBSTRATES AND GLASS SUBSTRATES FOR THE PRODUCING OF DISPLAY SCREENS

The invention relates to a process for treating glass substrates, and more specifically glass sheets, which are intended to be subsequently coated with layers or other coatings for the production of display screens.

The display screens to which the invention relates are especially plasma screens of all types, FED (Field Emission Display) screens, LED (Light-Emitting Display) screens, LCD (Liquid Crystal Display) screens and more generally all display screens whose glass substrates have to undergo heat treatments during production of the screen.

The invention will be more particularly described with reference to the production of a plasma screen, which is essentially composed of two glass sheets. On at least one of these glass sheets are deposited one or more arrays of electrodes, a layer of dielectric material and layers consisting of phosphors corresponding, for example, to the green, red and blue colours. Before being joined together, the glass sheets also receive barriers and spacers whose functions consist in forming a multitude of cells and keeping the two glass sheets spaced apart.

All of the operations for producing these electrodes, layers or even spacers are accompanied by heat treatments.

The glass compositions normally used for this type of substrate are of the silica-soda-lime type which, if they are used as they are, undergo dimensional changes during the abovementioned heat treatments because of the temperatures reached, which are greater than the strain point temperatures of the said compositions.

These dimensional changes which occur are negligible for other applications. However, in the case of the aforementioned display screens, great dimensional precision is required, especially so as to allow production of individual cells where a plasma forms. This is because the precision in producing these cells or more precisely the precision in depositing the various abovementioned layers has a direct influence on the operating quality of the screen. The precision in aligning the electrodes and in the various deposition steps makes it possible to improve screen resolution and image quality.

A first requirement relating to these glass sheets is therefore dimensional stability during the various heat treatments that the glass sheets undergo during production of display screens.

Solutions have already been suggested for improving this dimensional stability.

A first solution already proposed consists in making the glass sheet undergo a "precompaction" treatment; such a treatment consists of a heat treatment with a heat cycle tailored to the glass composition and to the heat treatments that the glass sheets will undergo during production of the screens. Such a treatment is, for example, carried out on sheets made from a glass composition of the silica-soda-lime type, before the heat treatments corresponding to the manufacture of the display screen are carried out.

Another solution that has also been proposed consists in producing glass sheets with particular compositions having high strain point values. The heat treatments undergone by such glass sheets result in smaller dimensional changes than in glass compositions of the more usual silica-soda-lime type.

A final solution, especially described in documents WO 99/13471 and WO 99/15472, consists in chemically toughening the glass sheets of the usual silica-soda-lime type by dipping them in an alkaline bath.

Apart from the better dimensional stability obtained according to these documents, this solution also meets a second requirement relating to the application of display screens since the chemical toughening carried out on the glass sheets imposes on them compressive surface stresses which increase their mechanical strength. This is because such sheets undergo an enormous number of handling operations until the end of the display screen manufacturing cycle, especially because of the many deposition steps that have to be carried out. Furthermore, the glass sheets are stressed during the heat treatments associated with the deposition of layers during the processes for manufacturing display screens. These thermally induced is stresses give rise to the risk of fracture during manufacture, this risk becoming more acute when the manufacturer seeks to accelerate the manufacturing cycles and increase the production rates. Improving the mechanical properties thus makes it possible to limit as far as possible the risk of the said glass substrates fracturing. Moreover, it seems that the improvement produced by the chemical toughening disappears after the various heat treatments carried out for depositing the various layers.

At the present time, there is a trend towards a new requirement regarding glass substrates for the manufacture of display screens since the desire in the display screen industry is to provide screens, the glass panes of which has already been assembled, and therefore all the heat treatments have been carried out thereon, which have sufficient mechanical strength. The screens thus formed must also undergo various handling operations in order to complete the manufacture and, furthermore, they are also liable during their use to be subjected to tensile forces either of an accidental nature or simply because of their use; for example, FED-type screens are subjected to tensile forces created by the atmospheric pressure which is exerted on the surface of the glass. Another example relates to plasma screens which are subjected to thermal stresses due especially to overheating at the centre of the screen with respect to the edges.

The inventors were thus tasked with producing glass substrates or sheets which meet, on the one hand, the first requirements mentioned, namely satisfactory dimensional stability during the heat treatments associated with the deposition of layers and mechanical reinforcement created before the said treatments, and which have, on the other hand, after assembling the glass sheets, and therefore after all of the said heat treatments, satisfactory mechanical strength.

This objective has been achieved according to the invention by a process for treating a glass sheet which consists of a glass composition having a strain point (the temperature corresponding to a viscosity of $10^{14.6}$ poise) above 540° C. and is intended for producing display screens, the said process including at least one ion-exchange treatment on at least part of the surface of the glass sheet and a precompaction treatment.

The precompaction treatment is a treatment carried out at a temperature below the dilatometric softening point. This treatment is used to relax the structure so that it becomes more stable during the subsequent heat cycles, such as those corresponding to the various layer deposition operations.

Advantageously, this treatment is therefore carried out at a glass viscosity of greater than $10^{12}$ poise.

Preferably, the glass sheet has a resistivity ρ (expressed in ohm.cm at 250° C.) such that $\log_{10} \rho > 7.5$. Such resistivities are particularly advantageous in the case of display screens because of the high electrical voltages used to make them operate.

Advantageously, and especially for obtaining products that can be produced on an industrial scale, the treatment process is designed to be applied to glass sheets obtained according to the float process.

According to a first method of implementing the invention, the precompaction treatment is combined with an ion-exchange treatment and is thus carried out simultaneously, the ion-exchange thermal cycle being adapted for carrying out a precompaction treatment.

According to a second method of implementing the invention, the treatment is carried out in two successive steps, the first consisting of a precontraction step and the second consisting of ion exchange on at least part of the surface of the glass sheet.

The inventors have in fact demonstrated that the treatment according to the invention, applied to glasses having a strain point above 540° C., makes it possible, on the one hand, to meet the dimensional stability constraints and, on the other hand, confers on the glass sheet a mechanical reinforcement which remains after the thermal cycles corresponding to the deposition of layers for the manufacture of display screens.

The results obtained according to the invention are surprising: it was not expected that the reinforcement obtained by an ion-exchange treatment on glasses having a high strain point and, a high resistivity could be sufficient and also be retained (at least partially) after the heat treatments corresponding to the manufacture of display screens since their combined properties—high resistivity and a high strain point—require the alkali metal concentrations in the glass to be limited, one thing which is not favourable for ion exchange in the glass.

According to a first method of implementing the invention, the precompaction treatment is a heat treatment consisting of a temperature hold for a time of between 1 and 200 hours and advantageously, in certain methods of implementation, between 1 and 20 hours at a temperature of between 400 and 660° C., the temperature hold being reached in at least one hour and preferably in at least two hours and the temperature then being brought back down to 90° C. over at least one hour and preferably over at least three hours.

Regarding the ion-exchange treatment, this is carried out according to a first variant by depositing, on at least part of the surface of the glass sheet, a paste comprising a potassium salt and a compound having a high melting point, such as a refractory based on alumina or silica, or a sulphate or chloride. Such an ion-exchange reinforcing process is especially described in French Patent FR-A-2 353 501. It can be carried out in a relatively short time, by reinforcing only the areas of the glass sheet which require to be reinforced.

According to a second variant of the invention, the ion exchange on at least part of the glass sheet is carried out in a bath containing at least one alkali metal salt.

Preferably, the bath contains a molten potassium nitrate salt for bringing about sodium/potassium exchange on the surface of the glass sheet.

Also preferably, this chemical toughening, or ion exchange, is carried out in a bath at a temperature of between 400 and 660° C. and advantageously above 480° C., for a time of between 1 and 360 hours and advantageously less than 200 hours. Advantageously, the temperature of the bath is raised over at least one and preferably two hours. Also advantageously, the temperature of the bath is lowered to 90° C. over at least one and preferably three hours.

The invention also relates to a glass substrate or sheet having properties allowing it to be used for the manufacture of display screens.

Such a glass substrate, advantageously obtained using the float process, consists, according to the invention, of a glass composition having a strain point above 540° C. and has, after at least one heat treatment intended for depositing a layer for the purpose of manufacturing a display screen, an absolute compaction value of less than 60 ppm and a thermal performance value of less than 60 ppm and a thermal performance DT of greater than 130° C.

Advantageously, the glass composition has an expansion coefficient of greater than $65 \times 10^{-7}$. Such expansion coefficient values are especially favorable for the sealing operations needed to manufacture screens.

Also advantageously, the glass composition has a resistivity $\rho$ (expressed in ohm.cm at 250° C.) such that $\log_{10}\rho > 7.5$. Such a resistivity value is more particularly suitable for the high voltages which may exist in display screens.

The compaction value is expressed in part per million (ppm) and corresponds to a quantity illustrating the dimensional stability of the glass substrate. It is determined after a heat treatment by determining the ratio of the dimensional change due to the heat treatment, by measurement on the specimen before and after the said heat treatment, to the corresponding initial length measured on the substrate. The heat treatment used corresponds to a temperature hold of two hours at 580° C., with the temperature rising at 10° C./min and then the temperature falling at a rate of 5° C./min. Such a treatment is representative of one or even more heat treatments undergone by a glass substrates for producing a display screen.

The thermal performance is determined by a thermal fracture test on glass substrates that have undergone a standard forming for display screens. This test is carried out on eight specimens which are glass plates having the dimensions of $415 \times 415$ mm$^2$ and a thickness of 2.8 mm. This test consists in heating a glass plate at its centre by radiation, while keeping the edges cold. To do this, the edges of the substrate are held in a rabbet under 12.5 mm in width in a frame through which water at 20° C. circulates. The centre of the substrate is heated by resistance heating elements at 4° C./min. The temperatures at the centre and at the edge are recorded at the time of fracture. The thermal performance DT of the substrate is the difference between the centre temperature and the edge temperature at the moment of fracture. This thermal performance and the thermal test described above are very representative of the display screen application. Manufacturers of such screens desire to improve the productivity and, to do this, especially to increase the production rates; this leads, of course, to shorter heating and cooling times and therefore subjects the glass substrates to thermal shocks very similar to those in the test described above. Furthermore, it seems that the display area of the screens during their use is subjected to a temperature rise simply because of the use, whereas the edge of the substrate set into a frame is kept at a lower temperature. The thermal test is therefore representative of the stresses experienced by the glass substrates both while the display screens are being manufactured and while the said screens are being used.

Advantageously, the glass composition of the substrate according to the invention comprises the constituents below, in the following proportions by weight:

| | |
|---|---|
| SiO$_2$ | 40 to 75% |
| Al$_2$O$_3$ | 0 to 12% |
| Na$_2$O | 0 to 9% |
| K$_2$O | 3.5 to 10% |
| MgO | 0 to 10% |
| CaO | 2 to 11% |
| SrO | 0 to 11% |
| BaO | 0 to 17% |
| ZrO$_2$ | 2 to 8%. |

According to a first preferred embodiment of the invention, the glass composition of the substrate comprises the constituents below, in the following proportions by weight:

| | |
|---|---|
| SiO$_2$ | 60.1% |
| Al$_2$O$_3$ | 3.3% |
| Na$_2$O | 3.7% |
| K$_2$O | 8.5% |
| MgO | 1% |
| CaO | 5.6% |
| SrO | 10.3% |
| ZrO$_2$ | 6.9%. |

According to another preferred embodiment of the invention, the glass composition of the, substrate comprises the constituents below, in the following proportions by weight:

| | |
|---|---|
| SiO$_2$ | 68.3% |
| Al$_2$O$_3$ | 0.7% |
| Na$_2$O | 4.6% |
| K$_2$O | 5.6% |
| MgO | 0.1% |
| CaO | 9.7% |
| SrO | 6.5% |
| ZrO$_2$ | 4.1%. |

Further details and advantageous characteristics of the invention will become apparent below from the description of the comparative measurements made on substrates produced according to the invention and an other substrates.

To make comparative measurements, the inventors firstly chose two glass compositions for producing substrates, a first composition according to the invention (composition I), i.e. one having a high strain point, and a second composition (composition II) corresponding to a standard glass of the silica-soda-lime type. The table below gives the details of these compositions (in percentages by weight) and the strain point values:

| | COMPOSITION I | COMPOSITION II |
|---|---|---|
| SiO$_2$ | 60.1% | 71% |
| Al$_2$O$_3$ | 3.3% | 0.6% |
| Na$_2$O | 3.7% | 13.6% |
| K$_2$O | 8.5% | 0.3% |
| MgO | 1% | 4.1% |
| CaO | 5.6% | 9.7% |
| SrO | 10.3% | 0% |
| ZrO$_2$ | 6.9% | 0% |
| Strain Point | 602° C. | 508° C. |

The comparative tests consisted in measuring the contraction and thermal performance DT on substrates made from glass compositions I and II, with a thickness of 2.8 mm, and which were subjected or not to a precompaction treatment or a chemical toughening treatment, or a combination of a precompaction treatment and a chemical toughening treatment. All the substrates underwent an equivalent forming operation before treatment.

The precompaction treatment (denoted hereafter by PT) used is defined according to the glass composition and to the heat treatment undergone subsequently. For our tests, precompaction treatments were therefore defined so that they are "stabilizers" for the thermal cycle which simulates the steps in the manufacture of display screens and is defined below.

The precompaction treatment used for composition I was a heat treatment comprising a rise over 1 hour to 638° C., a first fall over 5 hours to 552° C. and finally a fall over 3 hours to room temperature.

The precompaction treatment used for composition II was a heat treatment comprising a temperature hold for a time of 2 hours at a temperature of 580° C. For this precompaction treatment, the temperature rose at a rate of 10° C./min and the said temperature of the substrate was then brought back down to 90° C. at a rate of 5° C./min.

The chemical toughening (denoted hereafter by CT) was carried out in a potassium nitrate bath at a temperature of 490° C. for 16 hours.

The glass substrates that underwent none, one or both of these treatments were then subjected to a thermal cycle simulating one or more steps in the manufacture of a display screen. This theoretical cycle (which will be called hereafter the manufacturing cycle) comprises a temperature hold for two hours at 580° C., the temperature having risen at 10° C./min, and then a drop in the temperature at 5° C./min.

The various results relating to the compaction values (expressed in ppm, with an error of ±30 ppm) and the thermal performance DT (expressed in ° C.) are given in the following table.

The term "untreated" means that the substrates underwent neither a precompaction treatment nor a chemical toughening treatment.

| | Substrate | Compaction value (ppm) | DT before manufacturing cycle (° C.) | DT after manufacturing cycle (° C.) |
|---|---|---|---|---|
| A | Composition I (untreated) | 346 | 125 | — |
| B | Composition I + PT | 0 | 80 | — |
| C | Composition I + CT | 174 | 275 | 210 |
| D | Composition I + PT + CT | 27 | 310 | 145 |
| E | Composition II (untreated) | 465 | 110 | — |
| F | Composition II + PT | 0 | 100 | — |
| G | Composition II | −510 | >320 | — |
| H | Composition II + PT + CT | −490 | >320 | 75 |

PT: Precompaction treatment
CT: Chemical toughening

The compaction values were measured after the "manufacturing cycle." The positive values are values indicating that the substrate has compacted and the negative values indicate that the substrate has expanded.

The thermal performance values DT which do not appear were not measured, either because the substrate was not acceptable due to its compaction value or because the substrate was not reinforced.

These results show that the only substrate having a satisfactory compaction value of less than 60 ppm and a satisfactory thermal performance DT of greater than 130° C., after the manufacturing cycle, is substrate "D" produced from composition I, which has a strain point 602° C. and was subjected to a precompaction treatment followed by a chemical toughening treatment.

The results, and especially the comparison between tests "D" and "H", show that the dimensional stability obtained according to the invention is a priori due especially to using glass compositions having high strain points.

What is claimed is:

1. A process for treating a glass sheet, which comprises: subjecting a glass sheet having a strain point above 540° C. simultaneously to at least one ion-exchange treatment on at least part of the surface of the glass sheet and a precompaction treatment, thereby producing a display screen, wherein the glass composition comprises the constituents below, in the following proportions by weight:

| | |
|---|---|
| $SiO_2$ | 40 to 75% |
| $Al_2O_3$ | 0 to 12% |
| $Na_2O$ | 0 to 9% |
| $K_2O$ | 3.5 to 10% |
| MgO | 0 to 10% |
| CaO | 2 to 11% |
| SrO | 0 to 11% |
| BaO | 0 to 17% |
| $ZrO_2$ | 2 to 8%. |

2. The process according to claim 1, wherein the precompaction treatment is a heat treatment carried out at temperatures corresponding to glass viscosities of greater than $10^{12}$ poise.

3. The process according to claim 1, wherein the glass composition has a resistivity ρ such that $\log_{10}\rho > 7.5$.

4. The process according to claim 1, wherein said process comprises subjecting said glass sheet to precompaction in a first step and then ion exchange in a second step on at least part of the surface of the glass sheet.

5. The process according to claim 4, wherein the precompaction step is a heat treatment in which the glass sheet is held at a temperature within the range of 400 to 660° C. for a time within the range of 1 to 20 hours, wherein the temperature at which the glass sheet is held is reached in at least one hour and wherein the temperature is then brought back down to 90° C. over at least one hour.

6. The process according to claim 1, wherein the ion exchange is carried out by depositing, on at least part of the surface of the glass sheet, a paste comprising a potassium salt and a compound having a high melting point.

7. The process according to claim 1, wherein ion exchange on at least part of the glass sheet is conducted in a bath containing at least one alkali metal salt.

8. The process according to claim 7, wherein the bath contains a molten potassium nitrate salt.

9. The process according to claim 7, wherein the ion exchange is conducted at a temperature within the range of 400 to 660° C. for a time within the range of 1 to 360 hours.

10. The process according to claim 1, wherein the glass composition comprises the constituents below, in the following proportions by weight:

| | |
|---|---|
| $SiO_2$ | 60.1% |
| $Al_2O_3$ | 3.3% |
| $Na_2O$ | 3.7% |
| $K_2O$ | 8.5% |
| MgO | 1% |
| CaO | 5.6% |
| SrO | 10.3% |
| $ZrO_2$ | 6.9%. |

11. The process according to claim 1, wherein the glass composition comprises the constituents below, in the following proportions by weight:

| | |
|---|---|
| $SiO_2$ | 68.3% |
| $Al_2O_3$ | 0.7% |
| $Na_2O$ | 4.6% |
| $K_2O$ | 5.6% |
| MgO | 0.1% |
| CaO | 9.7% |
| SrO | 6.5% |
| $ZrO_2$ | 4.1%. |

12. A process for treating a glass sheet, which comprises:

subjecting a glass sheet having a strain point above 540° C. to at least one ion-exchange treatment on at least part of the surface of the glass sheet by depositing, on at least part of the surface of the glass sheet, a paste comprising a potassium salt and a compound having a high melting point and a precompaction treatment, thereby producing a display screen, wherein the glass composition comprises the constituents below, in the following proportions by weight:

| | |
|---|---|
| $SiO_2$ | 40 to 75% |
| $Al_2O_3$ | 0 to 12% |
| $Na_2O$ | 0 to 9% |
| $K_2O$ | 3.5 to 10% |
| MgO | 0 to 10% |
| CaO | 2 to 11% |
| SrO | 0 to 11% |
| BaO | 0 to 17% |
| $ZrO_2$ | 2 to 8%. |

* * * * *